United States Patent
Diao (10) Patent No.: US 8,068,452 B2
(45) Date of Patent: Nov. 29, 2011

(54) SYNERGETIC TRANSMITTING SYSTEM FOR DIGITAL BROADCAST SFN AND METHOD THEREOF

(75) Inventor: Xinxi Diao, Guangdong Province (CN)

(73) Assignee: ZTE Corporation (CN)

( * ) Notice: Subject to any disclaimer, the term of this patent is extended or adjusted under 35 U.S.C. 154(b) by 616 days.

(21) Appl. No.: 12/302,052

(22) PCT Filed: May 24, 2006

(86) PCT No.: PCT/CN2006/001085
§ 371 (c)(1),
(2), (4) Date: Nov. 24, 2008

(87) PCT Pub. No.: WO2007/134486
PCT Pub. Date: Nov. 29, 2007

(65) Prior Publication Data
US 2009/0154582 A1    Jun. 18, 2009

(51) Int. Cl.
*H04W 4/00* (2009.01)
(52) U.S. Cl. .................. 370/328; 370/432
(58) Field of Classification Search .......... 370/310, 370/328, 329, 330, 343, 344, 345, 350, 431, 370/432, 464, 498, 503; 725/105, 118, 143, 725/148
See application file for complete search history.

(56) References Cited

U.S. PATENT DOCUMENTS

| | | | |
|---|---|---|---|
| 5,448,767 A * | 9/1995 | de Bot | 455/105 |
| 2003/0169697 A1 * | 9/2003 | Suzuki et al. | 370/310 |
| 2003/0174673 A1 * | 9/2003 | Tomobe et al. | 370/329 |
| 2005/0232223 A1 | 10/2005 | Muller | |
| 2006/0211372 A1 * | 9/2006 | Shellhammer et al. | 455/41.2 |

FOREIGN PATENT DOCUMENTS

| | | |
|---|---|---|
| CN | 1273465 A | 11/2000 |
| CN | 1318238 A | 10/2001 |
| EP | 0999661 A2 | 5/2000 |
| WO | 00/16505 A1 | 3/2000 |

OTHER PUBLICATIONS

International Search Report, Feb. 2007.
European Telecommunications Standards Institute: "Digital Video Broadcasting (DVB); Implementation Guidelines for DVB Terrestrail Services; Transmission Aspects." (Dec. 1, 1997).
Supplementary Search Report in corresponding European Application, Application No. EP 06741973, issued Nov. 16, 2010.

* cited by examiner

*Primary Examiner* — Kwang B Yao
*Assistant Examiner* — Obaidul Huq
(74) *Attorney, Agent, or Firm* — Banner & Witcoff, Ltd.

(57) ABSTRACT

A cooperative transmission system for single frequency digital broadcasting network and method thereof are disclosed, said system includes a first double-layer cooperative transmission structure with same frequency and a second double-layer cooperative transmission structure with same frequency, which are vertically aggregated; wherein each of the double-layer cooperative transmission structures with same frequency is made up of a main transmission layer including several main transmitters with same transmitting frequency and an auxiliary transmission layer including several auxiliary transmitters with same transmitting frequency; the electromagnetic wave transmitted by the main transmitters in the first double-layer cooperative transmission structure with same frequency and the electromagnetic wave transmitted by the main transmitters in the second double-layer cooperative transmission structure with same frequency have different frequencies. The present invention makes up the disadvantage of the single frequency network, and can greatly improve the spectrum efficiency of broadcasting channel, the coverage (especially the indoor coverage) of broadcasting signal and the effect of mobile receiving of broadcasting signal.

15 Claims, 5 Drawing Sheets

SYNERGETIC TRANSMITTING SYSTEM FOR DIGITAL BROADCAST SFN AND METHOD THEREOF

TECHNICAL FIELD

The present invention relates to the field of wireless communication, more specifically, to a cooperative transmission system applied in a digital broadcasting single frequency network and a method thereof.

BACKGROUND ART

Single frequency networking technology applied in Digital Audio Broadcasting-Territorial and Digital Video Broadcasting-Territorial systems refers to the adjacent transmitters in the systems synchronically transmitting the same broadcasting code stream with the same frequency. In the Digital Audio Broadcasting-Territorial and Digital Video Broadcasting-Territorial systems applying single frequency networking, the adjacent transmitters do not interference with each other, instead, additive gain can be obtained. One factor resulting in this effect in the single frequency networking is the introduction of a protection interval to OFDM, by which, ISI can be effectively suppressed or avoided.

In the Digital Audio Broadcasting-Territorial and Digital Video Broadcasting-Territorial systems applying single frequency networking (SFN), networking gain can be obtained through the adjacent transmitters synchronically transmitting the same broadcasting code stream at the same frequency. This fact has been validated by field verification. The result of the field verification of the COFDM-based Digital Video Broadcasting-Territorial system (DVB-T) and Digital Audio Broadcasting-Territorial system which apply single frequency networking shows that, in audio and video broadcasting systems applying single frequency networking, when the powers of signals received by the receiver from each of the adjacent transmitters are comparative, the introduction of the signals transmitted by the adjacent transmitters can greatly increase the average power of receiving signal and effectively decrease the variance of signal fading and the bit error rate of the signal. The measurement shows that when the single frequency network consists of three transmitters, the maximal SFN gain (diversity gain) is close to 6 dB. Here, the SFN gain refers to, under the same receiving effect, the ratio between the power of receiving signal required by the receiver when there is a single transmitter and the power of receiving signal required by the receiver when it is a single frequency network.

As a further improvement on the performance of the single frequency network, time-frequency selectivity of the channel can be artificially increased through introducing specific time-varying phase rotation into a transmitting signal at a transmitting antenna, thereby improving the effect of SFN diversity gain. Moreover, the method is compatible with the existing DVB-T and DAB standards. With cyclic delay transmission and double-antenna maximal ratio combining technology, the SFN network gain can be significantly increased, and it is entirely compatible with the existing standards, such as DVB-T.

Space-time coding technique, which has gained more and more attention since its appearance, opens an entirely new field for the development of wireless communication techniques since it can emphasize on improving not only the transmission performance but also the transmission speed. The scheme of orthogonal space-time block coding can be applied to obtain extra coding gain and diversity gain, thereby improving the system performance; meanwhile, the structure of the transceiver is simple and practical. In addition, space-time coding techniques can obtain a better diversity effect than SFN macro-diversity.

At present, the WIMAX system has applied Multi-BS-MBS mode, which requires multiple BSs participating in the same Multi-BS-MBS service to synchronically transmit the same multicast/broadcast data. Due to the synchronous multicast service among multiple BSs, MS can receive multicast/broadcast data from the multiple BSs, thereby improving the receiving reliability and spectrum efficiency. The space-time coding method and the structure of the transceiver using Multi-BS-MBS integrate the ideas of layered space-time code and space-time block code, and enable a receiver with a different number of receiving antennas to have different transmission speed and error performance.

Figure 1:
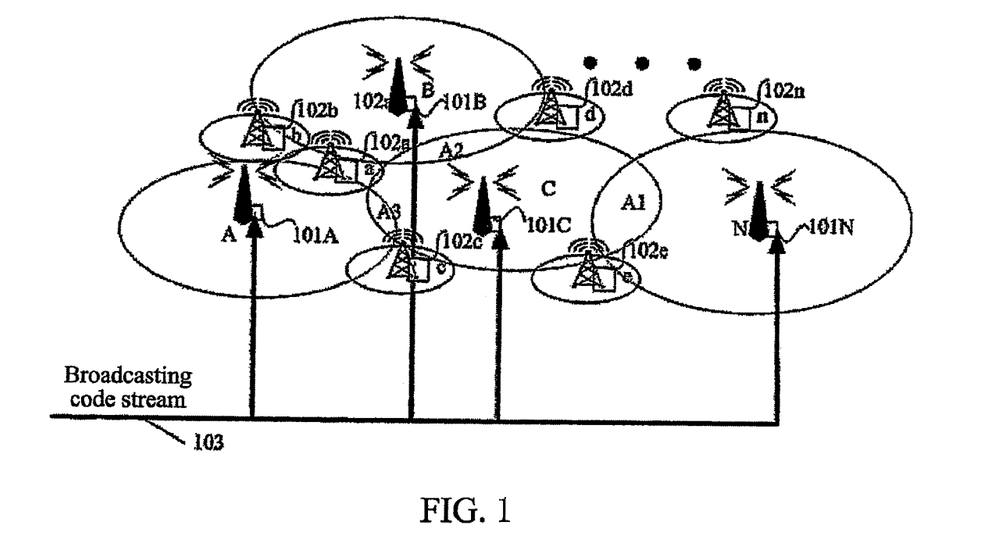
FIG. 1 is a structural diagram of the existing single frequency network.

From the network structure's viewpoint, the single frequency network currently used in digital broadcasting applies the general structure as shown in FIG. 1: the signal transmitted by transmitters 101A~101N covers the areas A~N, and the broadcasting code stream is distributed to each of the transmitters 101A~101N through feeding cable (or wireless link). For areas a~n in remote regions or in special geographical environments in which the transmitters 101A~101N can not cover well, relays 102a~102n (or repeaters) are used as complement. In the single frequency network structure shown in FIG. 1, transmitters 101A~101N and relays 102a~102n (or repeaters) transmit the same information symbol at the same frequency according to the required synchronization relationship. In this single frequency network structure, only the edges of the covered areas, such as A1, A2 and A3, have relatively high SFN gain as in the orthogonal frequency-diversity multiplexing digital mobile single frequency network.

The present SFN technique only applies single frequency networking among base stations in the same system, and it has a disadvantage in that only some areas at the edge of the cell have SFN gain, while in most areas, there is little or even no SFN gain.

The existing Multi-BS-MBS relates to the joint space-time coding between different channels of a single base station or between the base stations in the same system (or within the single-layer network), but it provides no solution for interlayer cooperative space-time coding in a hierarchical system.

SUMMARY OF THE INVENTION

The technical problem to be solved by the present invention is to offer a cooperative transmission system for a digital broadcasting single frequency network and a method thereof, by which, spectrum efficiency, mobility and coverage quality of the digital broadcasting system can be improved. By improving the spectrum efficiency through interlayer cooperative transmission, a flexible way for spectrum management and spectrum usage is provided.

The present invention offers a cooperative transmission system applied in a digital broadcasting single frequency network, including:

a first double-layer cooperative transmission structure with same frequency and a second double-layer cooperative transmission structure with same frequency, wherein these two structures are vertically aggregated together;

wherein, each of the double-layer cooperative transmission structures with the same frequency includes: a main transmission layer, which includes several main transmitters having the same transmitting frequency; an auxiliary transmission layer, which includes several auxiliary transmitters having the same transmitting frequency; wherein, in each of the double-layer cooperative transmission structures with the same frequency, the coverage range of electromagnetic wave transmitted by the main transmitters is larger than the coverage range of the electromagnetic wave transmitted by the auxiliary transmitters, and there is electromagnetic wave transmitted by at least one of the auxiliary transmitters in the coverage range of the electromagnetic wave transmitted by one main transmitter; the electromagnetic waves transmitted by the main transmitters and by the auxiliary transmitters have the same frequency, carry the same information symbols and meet the synchronization relationship required for avoiding inter-symbol interference; the electromagnetic wave transmitted by the main transmitters in the first double-layer cooperative transmission structure with the same frequency and the electromagnetic wave transmitted by the main transmitters in the second double-layer cooperative transmission structure with the same frequency have different frequencies.

When the second double-layer cooperative transmission structure with the same frequency is aggregated vertically with the first double-layer cooperative transmission structure with the same frequency, a dual interlayer cooperative transmission structure is constructed, wherein, the main transmission layer of the first double-layer cooperative transmission structure with the same frequency is taken as the upper layer, while the auxiliary transmission layer of the second double-layer cooperative transmission structure with the same frequency is taken as the bottom layer, and the auxiliary transmission layer of the first double-layer cooperative transmission structure with the same frequency and the main transmission layer of the second double-layer cooperative transmission structure with the same frequency are jointly taken as the middle layer.

One mode of the dual interlayer cooperative transmission structure is: the auxiliary transmitters of the first double-layer cooperative transmission structure with the same frequency and the main transmitters of the second double-layer cooperative transmission structure with the same frequency adopt the same transmitter or different transmitters at the same station site, wherein:
  the electromagnetic wave transmitted by the main transmitters in the first double-layer cooperative transmission structure with the same frequency and the electromagnetic wave transmitted by the auxiliary transmitters in the first double-layer cooperative transmission structure with the same frequency transmit, with the same frequency and meeting the synchronization relationship required for avoiding inter-symbol interference, the same information symbol; and
  the electromagnetic wave transmitted by the main transmitters in the second double-layer cooperative transmission structure with the same frequency and the electromagnetic wave transmitted by the auxiliary transmitters in the second double-layer cooperative transmission structure with the same frequency transmit, with the same frequency and meeting the synchronization relationship required for avoiding inter-symbol interference, the same information symbol.

The auxiliary transmission layer in the first double-layer cooperative transmission structure with the same frequency and the auxiliary transmission layer in the second double-layer cooperative transmission structure with the same frequency jointly act as the auxiliary transmission layer of the main transmission layer in the first double-layer cooperative transmission structure with the same frequency to form a dual interlayer cooperative transmission structure; the electromagnetic waves transmitted by the transmitters in these three layers have the same frequency, carry the same information symbols and meet the synchronization relationship required for avoiding inter-symbol interference.

The main transmission layer in the first double-layer cooperative transmission structure with the same frequency and the auxiliary transmission layer in the first double-layer cooperative transmission structure with the same frequency jointly perform space-time coding.

The main transmission layer in the first double-layer cooperative transmission structure with the same frequency, the auxiliary transmission layer in the first double-layer cooperative transmission structure with the same frequency, and the auxiliary transmission layer in the second double-layer cooperative transmission structure with the same frequency jointly perform space-time coding among the electromagnetic waves transmitted.

The electromagnetic waves transmitted by the main transmitters and the auxiliary transmitters in the same double-layer cooperative transmission structure with the same frequency further have a power relationship which meets the requirement of single frequency network gain.

The main transmitters and the auxiliary transmitters in the same double-layer cooperative transmission structure with the same frequency are locked at a common frequency in order to obtain the same frequency.

The main transmitters and the auxiliary transmitters in the same double-layer cooperative transmission structure with the same frequency receive the same broadcasting code stream through a stream distribution network in order to transmit the same information symbols.

The stream distribution network used by the auxiliary transmitters is a combination of the following one or more networks: a radio access network in cellular mobile communication, a CATV hybrid fiber and cable access network, a passive optical network, an active optical network, a power-line communication network, and a wireless network.

The transmitters in the auxiliary transmission layer in the first double-layer cooperative transmission structure with the same frequency use CATV network as their stream distribution network.

The transmitters in the auxiliary transmission layer in the first double-layer cooperative transmission structure with the same frequency only cooperatively transmit the code stream sent by the territorial broadcasting transmitters, or also transmit their own service code stream besides cooperatively transmitting the code stream sent by the territorial broadcasting transmitters.

The synchronization relationship required for avoiding the inter-symbol interference between the electromagnetic waves transmitted by the main transmitters and the auxiliary transmitters in the same double-layer cooperative transmission structure with the same frequency is:
  by taking the time point $t_0$ when the specific symbol sequence transmitted by the main transmitter arrives at the antenna aperture of the auxiliary transmitter as reference, the auxiliary transmitter transmits in a time range $\pm \Delta$ the symbol sequence which is the same as the information symbol sequence transmitted by the main transmitter, wherein $\Delta$ is the protection interval used by the main transmission layer.

The power relationship between the main transmitters and the auxiliary transmitters required for meeting the requirement of single frequency network gain is:
  in the area covered by the auxiliary base station, the intensities of the electromagnetic waves transmitted by the main transmitter and transmitted by the auxiliary transmitter are comparative, and their difference is within the range of the predetermined threshold;

when the intensity of the signal transmitted by the main transmitter is higher than the predetermined maximal threshold, the auxiliary transmitter will not transmit signal; and when the intensity of the signal transmitted by the main transmitter is lower than the predetermined minimal threshold, the auxiliary transmitter will decide the intensity of the transmitted signal independently.

The electromagnetic waves transmitted by the main transmitters and the auxiliary transmitters in the same double-layer cooperative transmission structure with the same frequency are encoded to be orthogonal frequency diversity multiplexing signals or spread spectrum signals.

The electromagnetic waves transmitted by the main transmitters and the auxiliary transmitters in the same double-layer cooperative transmission structure with the same frequency are jointly space-time encoded.

The main transmitters and the auxiliary transmitters in the same double-layer cooperative transmission structure with the same frequency transmit the electromagnetic wave with the same transmission mode, including continuous transmission or intermittent, periodic transmission by way of time slot.

When the main transmitters and the auxiliary transmitters transmit signals through intermittent and periodic transmission by way of time slot, the used spectrum is applied to bidirectional communication during the intermittent period of the transmission.

The main transmitters and the auxiliary transmitters are transmitters of territorial digital broadcasting, or transmitters of satellite digital broadcasting, or transmitters of cellular mobile communication base stations having the capability of broadcasting and transmitting.

The electromagnetic wave transmitted by the main transmitters and the auxiliary transmitters include a combination of the following one or more signals: a DVB-T signal, a DVB-H signal, or a DVB-S signal.

The present invention also offers a synchronization method based on the cooperative transmission system used to achieve the synchronization relationship between the main transmitters and the auxiliary transmitters in the double-layer cooperative transmission structure with the same frequency, including the following steps of:

(1) the auxiliary transmitter obtains the protection interval $\Delta$ used by the main transmission layer, the transmitting time $t_R$ of the electromagnetic wave corresponding to the coverage radius of the auxiliary transmitter, and also the error $\epsilon$ of the transmission time of the auxiliary transmitter;

(2) comparing the protection interval $\Delta$ with the transmission time $t_R$, and if $\Delta \gg t_R$, proceeding to step (6), otherwise, proceeding to step (3);

(3) determining whether the auxiliary transmitter applies an omni-directional antenna or not, if no, proceeding to step (4), otherwise, proceeding to step (5);

(4) obtaining the azimuth angle $\theta$ of the propagation direction of the electromagnetic wave transmitted by the main transmitter and the azimuth angle $\eta$ of the main-lobe direction of the antenna of the auxiliary transmitter, if the angle between $\theta$ and $\eta$ is larger than 90°, then proceeding to step (5), otherwise, proceeding to step (6);

(5) obtaining the arrival time $t_0$ of the signal transmitted by the main transmitter cooperating with the auxiliary transmitter in the main transmission layer, calculating the time advance $\beta$ of the transmission time of the auxiliary transmitter based on $t_0$, and then determining that the auxiliary transmitter transmits its signal synchronically with its cooperative main transmitter at the time point $t_0-\beta$ and within the error range $\pm\epsilon$; and (6) obtaining the arrival time $t_0$ of the signal transmitted by the main transmitter cooperating with the auxiliary transmitter in the main transmission layer, and determining that the auxiliary transmitter transmits signal synchronically with its cooperative main transmitter at the time point $t_0$ and within the error range $\pm\epsilon$.

The present invention also offers a method for determining the power based on the cooperative transmission system, to determine the power relationship between the main transmitters and the auxiliary transmitters in the double-layer cooperative transmission structure with the same frequency, including the following steps of:

(A) the auxiliary transmitter obtains a set of measured values {P1~Pk} of intensities of a transmission field of the cooperative main transmitter at different locations, based on which the estimated value P (x,y) of the distribution of the intensity of the transmission field of the main transmitter adjacent to the auxiliary transmitter is calculated;

(B) determining whether all the values of P (x,y) are larger than a predetermined high power threshold Thr_H or not, and if yes, directly determining that the transmit power of the auxiliary transmitter is 0, otherwise, proceeding to (C);

(C) determining whether all values of P (x,y) are less than a predetermined low power threshold Thr_L or not, and if yes, the auxiliary transmitter determines independently its own transmitting power, otherwise, proceeding to (D);

(D) determining whether the auxiliary transmitter applies the omni-directional antenna or not, and if yes, determining the transmit power P_om required by the transmission of the omni-directional antenna as the transmit power, otherwise, proceeding to step (E);

(E) obtaining the azimuth angle $\theta$ of the propagation direction of the electromagnetic wave transmitted by the main transmitter and the azimuth angle $\eta$ of the main-lobe direction of the antenna of the auxiliary transmitter, and if the angle between $\theta$ and $\eta$ is less than 90°, then proceeding to step (F), otherwise, proceeding to step (G);

(F) determining the power value P_sec_H, with which the intensity of the electromagnetic wave transmitted in most areas of the sector covered by the auxiliary transmitter is larger than the intensity of the electromagnetic wave of the main transmitter, as the transmit power; and (G) determining the power value P_sec_L, with which the intensity of the electromagnetic wave transmitted in most areas of the sector covered by the auxiliary transmitter is less than the intensity of the electromagnetic wave of the main transmitter, as the transmit power.

By using the present invention, the spectrum efficiency, coverage quality and mobility of the digital broadcast system are improved, and high compatibility may be held with the existing digital broadcast system. Meanwhile, the present invention provides a flexible mode for spectrum management and usage, for example, the digital broadcasting network and the mobile communication network can share the spectrum in a mutual beneficial and win-win situation.

DESCRIPTION OF THE PREFERRED EMBODIMENTS

In the following, the system of the present invention and the method thereof will be described in further detail in combination with the accompanying figures and the specifically described embodiments.

Figure 2:
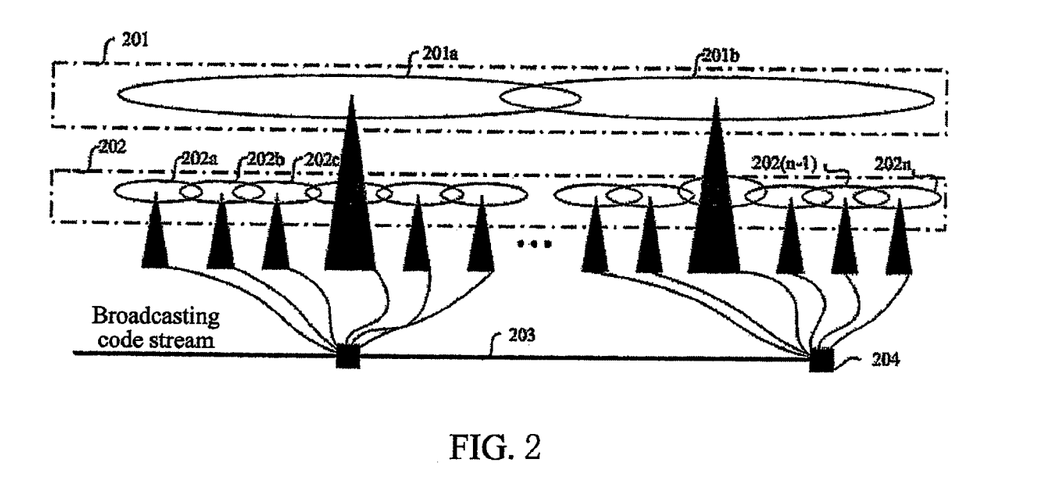
FIG. 2 is a structural diagram of a double-layer cooperative transmission structure with the same frequency in accordance with the present invention.

FIG. 2 shows a double-layer cooperative transmission structure with the same frequency in accordance with the present invention, which consists of the main transmission layer 201 and the auxiliary transmission layer 202, wherein:

the main transmission layer 201 consists of several main transmitters which can transmit electromagnetic waves which have the same frequency and cover a certain area; and the auxiliary transmission layer 202 consists of several auxiliary transmitters which can transmit electromagnetic waves which have the same frequency and cover a certain area.

In the main transmission layer 201, the coverage area of the electromagnetic wave (such as 201a) transmitted by the main transmitter is larger than the coverage area of the electromagnetic wave (such as 202a) transmitted by the auxiliary transmitter in the auxiliary transmission layer 202. Generally, in the coverage area of the electromagnetic wave transmitted by the main transmitter in the main transmission layer 201, there exists electromagnetic waves transmitted by several auxiliary transmitters, for example, in the area covered by electromagnetic wave 201a, there are electromagnetic waves 202a, 202b, 202c and so on.

The electromagnetic wave transmitted by the main transmitter in the main transmission layer 201 and the electromagnetic wave transmitted by the auxiliary transmitter in the auxiliary transmission layer 202 have the same frequency. A method for achieving the same frequency is that the main transmitters in the main transmission layer 201 and the auxiliary transmitters in the auxiliary transmission layer 202 are locked to a common carrier frequency, such as the carrier frequency of the Global Positioning System, Galileo System or other systems.

The electromagnetic wave transmitted by the main transmitters in the main transmission layer 201 and the electromagnetic wave transmitted by the auxiliary transmitters in the auxiliary transmission layer 202 meet the synchronization relationship required for avoiding inter-symbol interference. A method for achieving synchronization between the electromagnetic wave transmitted by the main transmitters in the main transmission layer 201 and the electromagnetic wave transmitted by the auxiliary transmitters in the auxiliary transmission layer 202 is: by taking the time point to when the specific symbol sequence emitted by the main transmitter arrives at the antenna aperture of the auxiliary transmitter as reference, the auxiliary transmitter transmits a symbol sequence which is same as the information symbol sequence transmitted by the main transmitter in the time range $\pm\Delta$ ($\Delta$ is the protection interval used by the main transmission layer).

The electromagnetic wave transmitted by the main transmitter in the main transmission layer 201 and the electromagnetic wave transmitted by the auxiliary transmitter in the auxiliary transmission layer 202 carry the same information symbols. One method is to send the same broadcasting code stream to all main transmitters in the main transmission layer 201 and to all auxiliary transmitters in the auxiliary transmission layer 202 through the stream distribution network 203, and the auxiliary transmitters together with the main transmitters they assist send out the information symbols sent through the stream distribution network 203 according to the specific synchronization relationship. These information symbols are the same as the information symbols sent by the main transmitter.

The stream distribution network 203 can be a wired network, such as a radio access network (RAN) in a cellular mobile system, a CATV hybrid fiber and cable (HFC) network, an all optical network (such as a passive optical network PON, an active optical network APON), or a power-line communication network; or it can be a wireless network, such as a radio link between the cellular base station and the relay, LMDS or satellite link.

The electromagnetic wave transmitted by the main transmitter in the main transmission layer 201 and the electromagnetic wave transmitted by the auxiliary transmitter in the auxiliary transmission layer 202 meet the power relationship required for creating good SFN gain. One power relationship required for creating good SFN gain is: in most area covered by the auxiliary base station, the intensity of the electromagnetic wave transmitted by the main transmitter and the intensity of the electromagnetic wave transmitted by the auxiliary transmitter are comparative, for example, the difference of the intensities is less than 10 dB. In areas where the intensity of the signal transmitted by the main base station is too high, such as being higher than a predetermined threshold Thr_H, the auxiliary base station will not transmit signal; in areas where the intensity of the signal transmitted by the main base station is too low, such as being lower than a predetermined threshold Thr_L, the auxiliary base station will independently decide the intensity of its transmitted signal.

One implementation method of the main transmitters in the main transmission layer 201 is to use the transmitters of terrestrial digital broadcasting, or the transmitters of satellite digital broadcasting, or the transmitters of cellular mobile communication base stations having the capability of broadcasting and transmitting.

One implementation method of the auxiliary transmitters in the auxiliary transmission layer 202 is to use the transmitters of terrestrial digital broadcasting. Another implementation method of the transmitters in the auxiliary transmission layer 202 is to use the transmitters of cellular mobile communication base stations having the capability of terrestrial digital broadcasting, or comprehensively designed with the transmitters of terrestrial digital broadcasting.

One cooperation method between the electromagnetic wave transmitted by the main transmitter in the main transmission layer 201 and the electromagnetic wave transmitted by the auxiliary transmitter in the auxiliary transmission layer 202 is that both of them apply COFDM signal, and joint space-time coding is not used between the layers. Such inter-layer cooperation is used to achieve complete compatibility with the existing broadcasting standards, such as DVB-T, DVB-S, DVB-H, ISDB, DMB, DAB.

One cooperation method between the electromagnetic wave transmitted by the main transmitter in the main transmission layer 201 and the electromagnetic wave transmitted by the auxiliary transmitter in the auxiliary transmission layer 202 is to use interlayer joint space-time coding, namely: joint space-time coding is performed for the electromagnetic waves (such as 201a) in the main transmission layer 201 and the electromagnetic waves (202a, 202b, 202c) in the auxiliary transmission layer 202 in the coverage area of the main transmission layer 201. Such interlayer cooperation is used to achieve a better spectrum efficiency.

The electromagnetic waves (such as 201a) transmitted by the main transmitter in the main transmission layer 201 and the electromagnetic waves (such as 202a~202n) transmitted by the auxiliary transmitter in the auxiliary transmission layer 202 may contain signals of only one single standard, such as DVB-T signals, or it may contain signals of several standards, such as contain both DVB-T signals and DVB-H signals, or it may contain all of DVB-T signals, DVB-H signals and DVB-S signals.

One cooperation method between the electromagnetic wave transmitted by the main transmitter in the main transmission layer 201 and the electromagnetic wave transmitted by the auxiliary transmitter in the auxiliary transmission layer 202 is that both of them use spread spectrum signals, such as CDMA signals, while joint space-time coding is not used between the layers. Such interlayer cooperation can be used to obtain a more abundant multi-path.

One cooperation method between the electromagnetic wave transmitted by the main transmitter in the main transmission layer 201 and the electromagnetic wave transmitted by the auxiliary transmitter in the auxiliary transmission layer 202 is that both of them use spread spectrum signals, such as CDMA signals, while joint space-time coding is used between the layers. Such interlayer cooperation can be used to obtain a better gain of space-time coding.

One mode for the main transmitters in the main transmission layer 201 to transmit the electromagnetic wave is continuous transmission, at the same time, the auxiliary transmitters in the auxiliary transmission layer 202 synchronically and continuously transmit the electromagnetic wave.

One mode for the main transmitters in the main transmission layer 201 to transmit the electromagnetic wave is to transmit intermittently, periodically by way of time slot, and at the same time, the auxiliary transmitters in the auxiliary transmission layer 202 also intermittently and periodically transmit the electromagnetic wave by way of time slot synchronically with the main transmitters. When the main transmitters in the main transmission layer 201 and the auxiliary transmitters in the transmission layer 202 transmit broadcasting signals intermittently and periodically by way of time slot, the spectrum used is applied to bidirectional communication during the intermittent period of the transmission. One method for applying the spectrum used by the main transmitters in transmission layer 201 and the auxiliary transmitters in transmission layer 202 into bidirectional communication during the intermittent period of broadcasting signal transmission is TDD.

Figure 3:
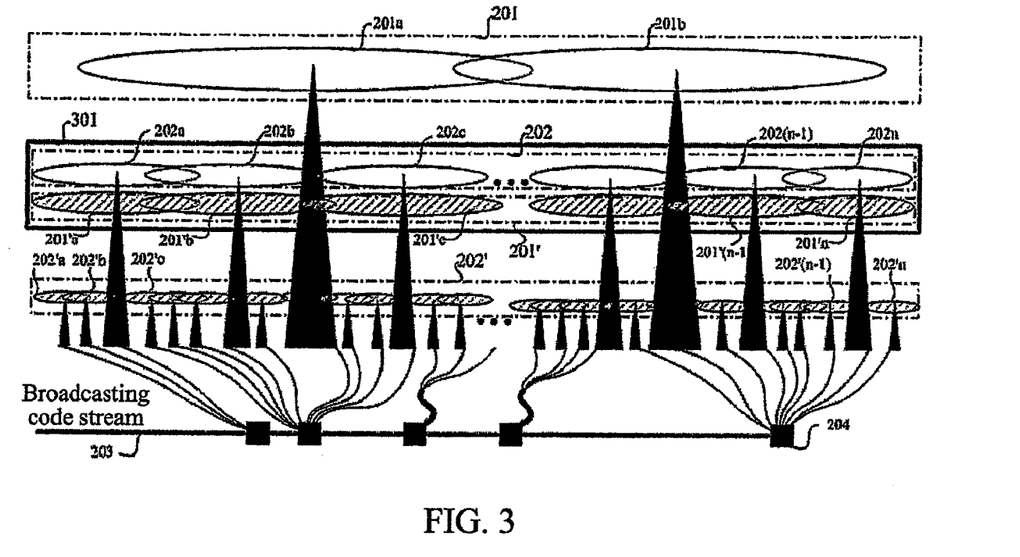
FIG. 3 is a structural diagram of a dual interlayer cooperative transmission in accordance with the present invention.

On the basis of the double-layer cooperative transmission structure with the same frequency, the present invention further offers a dual-interlayer cooperative transmission structure. As shown in FIG. 3, a dual interlayer cooperative transmission structure is constructed by accumulating two double-layer cooperative transmission structures with the same frequency vertically.

The upper layer 201 of the dual interlayer cooperative transmission structure, including 201a and 201b, is a main transmission layer of a double layer cooperative transmission structure with the same frequency; the bottom layer 202', including 202'a~202'n, is an auxiliary transmission layer of another double layer cooperative transmission structure with the same frequency; the middle layer 301 of the dual interlayer cooperative transmission structure consists of the auxiliary transmission layer 202 of the double layer cooperative transmission structure with the same frequency on the upper part and the main transmission layer 201' of the double layer cooperative transmission structure with the same frequency on the bottom part, wherein 201' includes 201'a, 201'b, . . . 201'n.

In the dual interlayer cooperative transmission structure, the auxiliary transmitters and the main transmitters that the auxiliary transmitters aid synchronously/simultaneously send the information symbols transmitted from the stream distribution network 203 with the same frequency and same symbols according to a specific synchronization relationship.

The stream distribution network 203 in the dual interlayer cooperative transmission structure can be a wired network, such as the radio access network (RAN) in cellular mobile communication, a CATV hybrid fiber and cable (HFC) network, an all optical network (such as a passive optical network PON, an active optical network APON), a power-line communication network; or it can be a wireless network, such as a radio link between a cellular base station and relay, LMDS or satellite link.

One working mode of the dual interlayer cooperative transmission structure is: the auxiliary transmission layer 202 in the middle layer 301 and the upper layer 201 make up the double-layer cooperative transmission structure with the same frequency, and its working principle is the same as that of the aforementioned double layer cooperative transmission structure with the same frequency; the main transmission layer 201' in the middle layer 301 and the bottom layer 202' make up another double layer cooperative transmission structure with the same frequency, whose working principle is the same as that of the aforementioned double layer cooperative transmission structure with the same frequency.

The feature of the dual interlayer cooperative structure lies in that: the auxiliary transmitters in the main transmission layer 202 which make up the middle layer 301 and the main transmitters in the auxiliary transmission layer 201' of another double layer cooperative transmission structure with the same frequency are determined according to the requirement of signal coverage, and there is no definite proportional relationship between the main transmitters and the auxiliary transmitters, for example, the main transmitters and the auxiliary transmitters are corresponding with each other in quantity and cooperate with each other as pairs, each pair of transmitters can be the same transmitter in terms of physical relationship, or different transmitters at the same site, that is, each pair of the double layer electromagnetic wave signals, such as (202a, 201'a), (202b, 201'b), . . . (202n, 201'n), are transmitted by the same transmitter or different transmitters at the same site.

For example, each pair of the electromagnetic wave signals of the two layers making up the middle layer 301, such as (202a, 201'a), (202b, 201'b), . . . (202n, 201'n), are transmitted by the same transmitter, or different transmitters at the same site, and the signals with different frequencies can be transmitted through the same antenna and feeder.

For example, each pair of the electromagnetic wave signals of the two layers making up the middle layer 301, such as (202a, 201'a), (202b, 201'b), . . . (202n, 201'n), apply different frequencies, for example, in (202a, 201'a), the frequency of 202a is the same as that of the upper layer 201, while the frequency of 201'a is the same as that of the bottom layer 202'.

One working mode of the bottom layer 202' of the dual interlayer cooperative structure is: the bottom layer 202' and the auxiliary transmission layer 202 in the middle layer 301 work together as the auxiliary transmission layer of the upper layer 201 to construct a multiple cooperative transmission, while joint space-time coding is not applied between the layers, such that a better SFN gain can be obtained, and complete compatibility can be held with the existing digital broadcasting standard.

One working mode of the bottom layer 202' of the dual interlayer cooperative structure is: the bottom layer 202' and the auxiliary transmission layer 202 in the middle layer 301 work together as the auxiliary transmission layer of the upper layer 201 to construct a multiple cooperative transmission, while joint space-time coding is applied between the layers, such that a better space-time encoding gain can be obtained and the spectrum efficiency is further improved.

In order to achieve the double-layer cooperative transmission with the same frequency of the present invention, the following three synchronizations need to be implemented between the main transmission layer and the auxiliary transmission layer: frequency synchronization, time synchronization and bit synchronization.

(1) Frequency Synchronization

The modulated COFDM signal consists of 2 k or 8 k carriers, each of which must use the same frequency, and all the carriers of each transmitter in a single frequency network must use the same frequency; the precision of the frequency depends on the distance between the carriers; we define the distance between the carriers as $\Delta f$, and fn as the position of the $n^{th}$ carrier, then the desirable frequency precision is fn± ($\Delta f/100$). In order to make the precision of IF and RF after being cascaded in the transmission system still satisfy the above desirable precision, a common way is to synchronize the upper frequency conversion local oscillator of all transmitters to a reference clock, such as a GPS clock.

(2) Time Synchronization

Theoretically speaking, as long as a suitable protection interval is applied and the distance between the transmission towers is reasonably designed, COFDM modulation can resist multiple path reflection, which requires the transmitters to achieve time synchronization, wherein the same code stream symbol should be transmitted from different transmitters at the same time; however, because of the protection interval, the precision of time may not be high, usually ±1 μs is relatively moderate.

(3) Bit Synchronization

In order to transmit the same symbol at the same time, all carriers should be consistently modulated; therefore, the same bit should be modulated to the same carrier, which should be strictly obeyed. In a single frequency network, the modulator of each transmitter is connected to the multiplexer at the front end through different stream distribution networks, so the time delay for introduction is also different. Since the multiplexer can not offer a time reference to the modulator in the transmitter, it is necessary to obtain a time standard whose precision is better than 1 uS from the outside of the system. The most practical way is to obtain a 10 MHz standard frequency and standard time from GPS.

Figure 4:
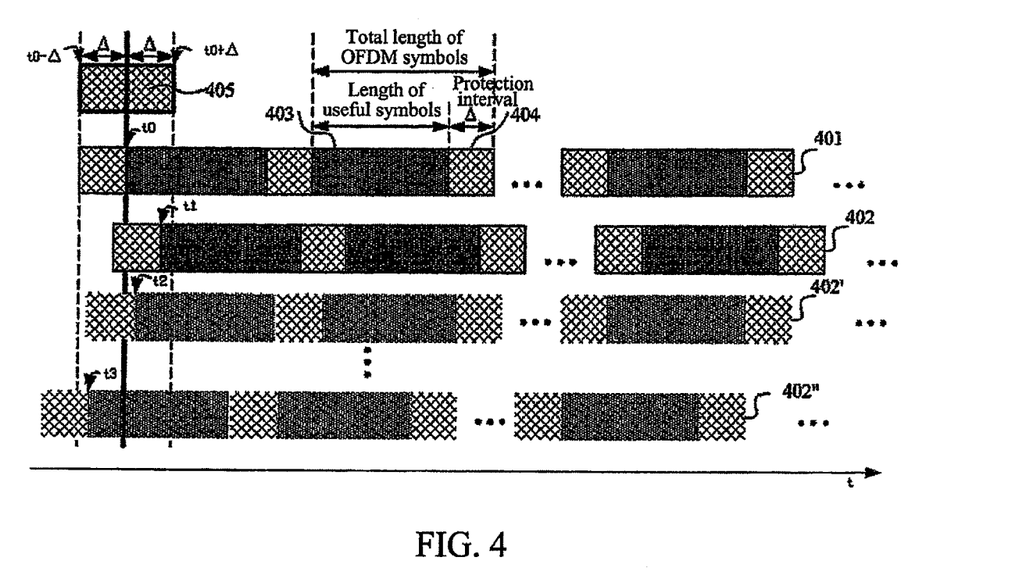
FIG. 4 is a schematic view of the synchronization relationship in accordance with the present invention.

For OFDM modulation, the synchronization relationship required by double-layer cooperative transmission with the same frequency is shown as FIG. 4. When there are multiple paths, $t_0$, $t_1$, $t_2$ and $t_3$ in FIG. 4 represent the time of the first path; the OFDM sequence 401 sent by the main transmission layer 201 includes usable symbol 403 and protection interval 404, the starting point of a usable symbol 403 in the OFDM sequence 401 arrives at the antenna of an auxiliary transmitter at the time point of $t_0$; the starting point of the same usable OFDM symbol transmitted by the main transmitter as well as in the OFDM sequence 402 sent by one auxiliary transmitter in the auxiliary transmission layer 202 leaves the transmit antenna at the time point of $t_1$; and other possible positions of the OFDM sequence 402 sent by one auxiliary transmitter in the auxiliary transmission layer 202 are shown as 402' and 402", the corresponding time points of leaving the antenna are $t_2$ and $t_3$. In order to avoid inter-symbol interference, taking $t_0$ as the reference point, the absolute value ($|t_0-t_1|$) of time difference between $t_0$ and the starting point $t_1$ of the same usable OFDM symbol transmitted by the auxiliary transmitter and by the main transmitter must be far less than $\Delta$. Furthermore, in order to avoid inter-symbol interference, at any point covered by the auxiliary transmitter, the absolute time difference ($|t'_0-t'_1|$) between the time point $t'_1$ when the starting point of OFDM symbol transmitted by the auxiliary transmitter arrives at this point and the time point $t'_0$ when the starting point of the same OFDM symbol transmitted by the main transmitter arrives at this point is less than $\Delta$.

The synchronization of the double-layer cooperative transmission with the same frequency and that of the existing single frequency network have the following differences:

1) The arrival time of the multi-path interference in digital broadcasting always lags behind the arrival time of the first path of the signal transmitted by the transmitter; and
2) The antenna of digital broadcasting is generally non-directional and sector antenna will not be applied, however, in the application of the double layer cooperative transmission with the same frequency, when the transmitter of cellular mobile network base station is used as the auxiliary transmitter of the present invention, a plurality of sector antennas will be used to transmit the broadcasting signals to cover an area.

Figure 5:
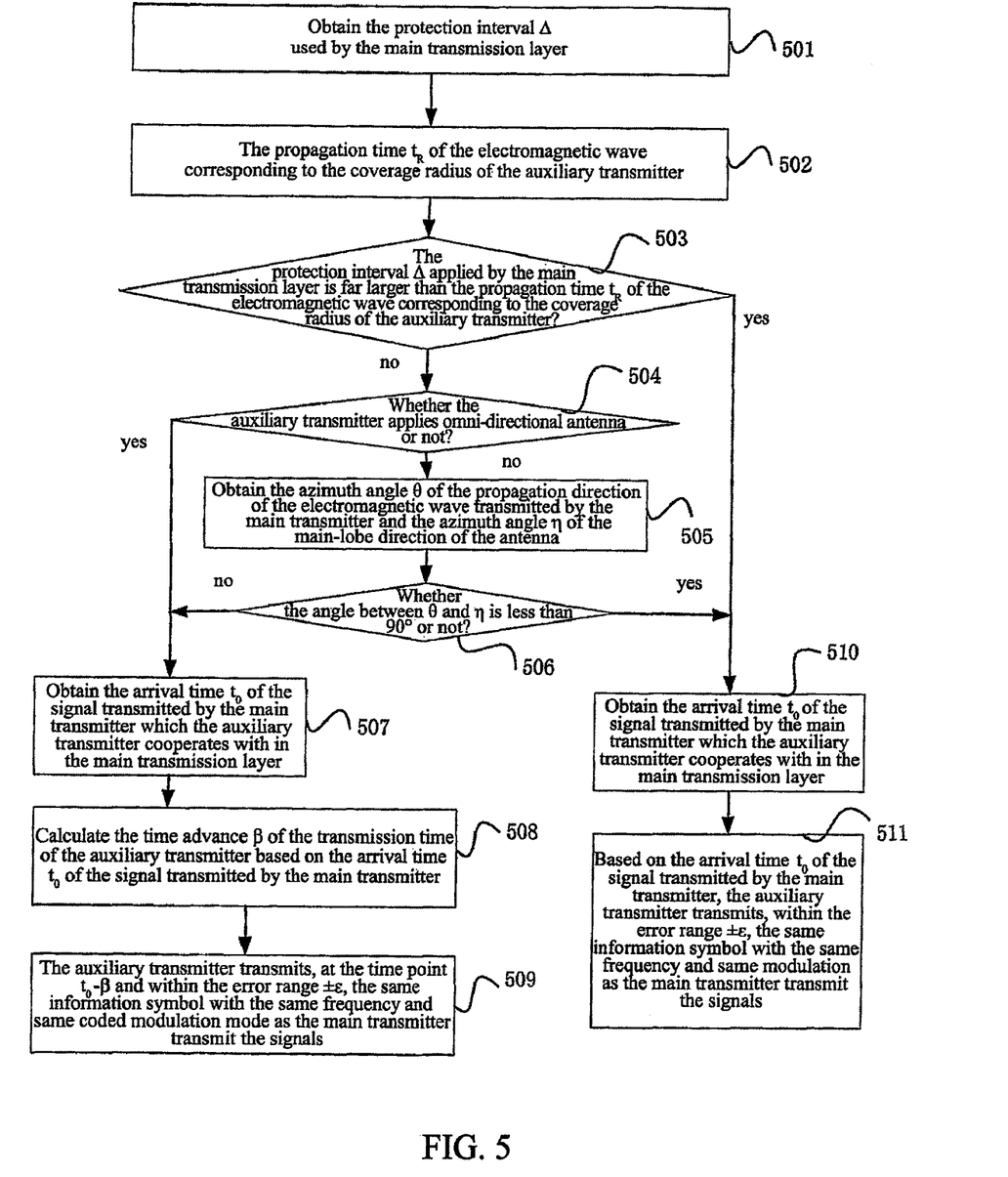
FIG. 5 is a synchronization method of the inter-layer cooperative transmission with the same frequency in accordance with the present invention.

With respect to the above special issues, the present invention offers a synchronization method for achieving the synchronization relationship between the main transmitters and the auxiliary transmitters in the double-layer cooperative transmission structure with the same frequency, which includes the following steps as shown in FIG. 5:

501: obtaining the protection interval data $\Delta$ used by the main transmission layer 201;

502: obtaining the time of electromagnetic wave propagation $t_R$ that corresponds to the radius of coverage of the auxiliary transmitter, and determining that the range of transmission time error is ±ε;

503: determining whether the protection interval $\Delta$ applied by the main transmission layer 201 is >>(far larger than) the time of electromagnetic wave propagation $t_R$ that corresponds to the radius of coverage of the auxiliary transmitter, wherein, far larger (>>) means the value of the protection interval $\Delta$ is over three times of the time of electromagnetic wave propagation $t_R$ that corresponds to the radius of the coverage of the auxiliary transmitter; if yes, successively proceeding to step 510 and step 511, otherwise proceeding to step 504;

504: determining whether the auxiliary transmitters apply omni-directional antenna or not, and if yes, then proceeding to step 507, otherwise, proceeding to step 505;

505: obtaining the azimuth angle θ of the propagation direction of the electromagnetic wave transmitted by the main transmitters and the azimuth angle η of the main-lobe direction of the antenna, then proceeding to step 506;

506: determining whether the angle between θ and η is less than 90° or not, and if yes, then successively proceeding to step 510 and step 511, otherwise, proceeding to step 507;

507: obtaining the arrival time $t_0$ of the signal transmitted by the main transmitters which the auxiliary transmitters in the main transmission layer cooperate with;

508: calculating the time advance β of the transmission time of the auxiliary transmitters based on the arrival time $t_0$ of the signal transmitted by the main transmitters;

509: the auxiliary transmitters transmitting the same information symbol with the same frequency and same coded modulation method as the main transmitters transmit the signals, at the time point $t_0$-β and within the error range ±ε;

510: obtaining the arrival time $t_0$ of the signal transmitted by the main transmitters which the auxiliary transmitters in the main transmission layer cooperate with; and 511: transmitting the same information symbol with the same frequency and same coded modulation method as the main transmitters transmit the signals, based on the arrival time $t_0$ of the signal transmitted by the main transmitters and within the error range ±ε.

Figure 6:
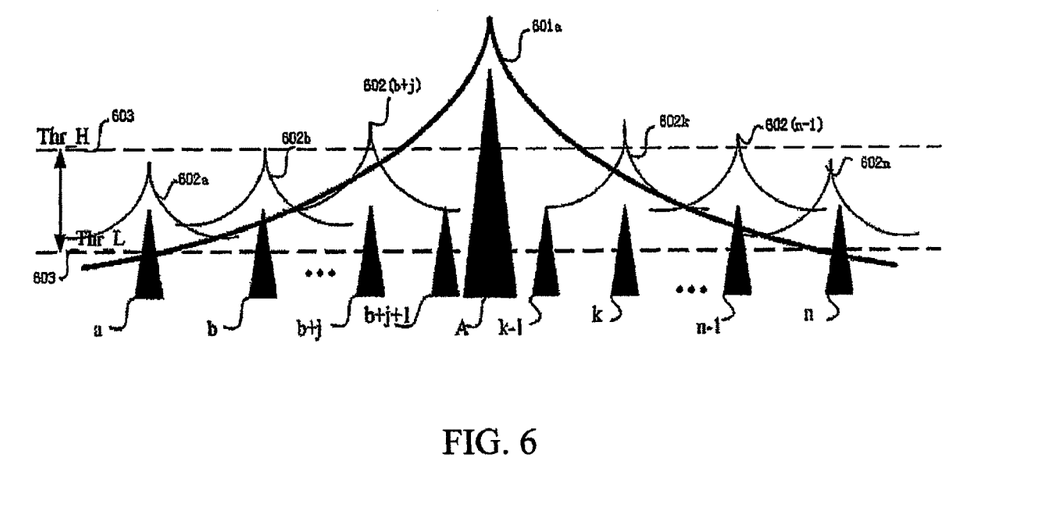
FIG. 6 is a schematic view of the distribution of the intensity of the electromagnetic wave in the double-layer cooperative transmission structure with the same frequency.

In order to obtain a relatively high SFN gain, it should be guaranteed that the electromagnetic field transmitted by the auxiliary transmission layer and the electromagnetic field transmitted by the main transmitter, which the auxiliary transmitter assists, have comparative intensity at geographical positions as many as possible in the geographical area covered by all auxiliary transmitters, for example, the intensity difference is within 10 dB. As shown in FIG. 6, 601a is a space distribution curve of the intensity of the electromagnetic field transmitted by transmitter A in the main transmission layer, 602a~602n are space distribution curves of the intensity of electromagnetic field transmitted by each of the auxiliary transmitters covered in 601a. Thr_H is a predetermined value of the intensity of the electromagnetic field transmitted by the main transmitter; when the practically measured intensity of the electromagnetic wave transmitted by the main transmitter in the area covered by the auxiliary base station is larger than Thr_H, it indicates that the signal is strong enough, and it is unnecessary to use auxiliary transmission for extra SFN gain. Thr_L is a predetermined value of the intensity of electromagnetic wave transmitted by the main transmitter; when the practically measured intensity of the electromagnetic wave transmitted by the main transmitter in the area covered by the auxiliary base station is less than Thr_L, it indicates that the intensity of the signal is lower than the intensity needed for receiving it normally, and the SFN gain needed for normal receiving can not be obtained when the auxiliary transmitter transmits a signal whose intensity is comparative with the electromagnetic wave transmitted by the main transmitter in the area covered by the auxiliary base station. In such a situation, in order to guarantee the coverage, the auxiliary transmitter needs to determine its transmitting power independently. The transmitting power of the transmitters in FIG. 6, from a, b to b+j, and from n, n−1 to k, is increased gradually, indicating that in order to obtain a relatively high SFN gain, the intensity of the electromagnetic wave of the auxiliary transmitters should be comparative to the intensity of the electromagnetic field 601a of the main transmitters as far as possible. Since the intensity of the electromagnetic field 501a at the position where the transmitters b+j+1, k−1 are located is larger than the threshold Thr_H, transmitters b+j+1, k−1 do not need to transmit.

There may be signal block in the practical environment, such as caused by buildings, which will lead to changes in the distribution of field intensity as shown in FIG. 6. Since such changes of distribution of field are hard to predict, they can only be accurately obtained through real-time, in-site measurement.

Figure 7:
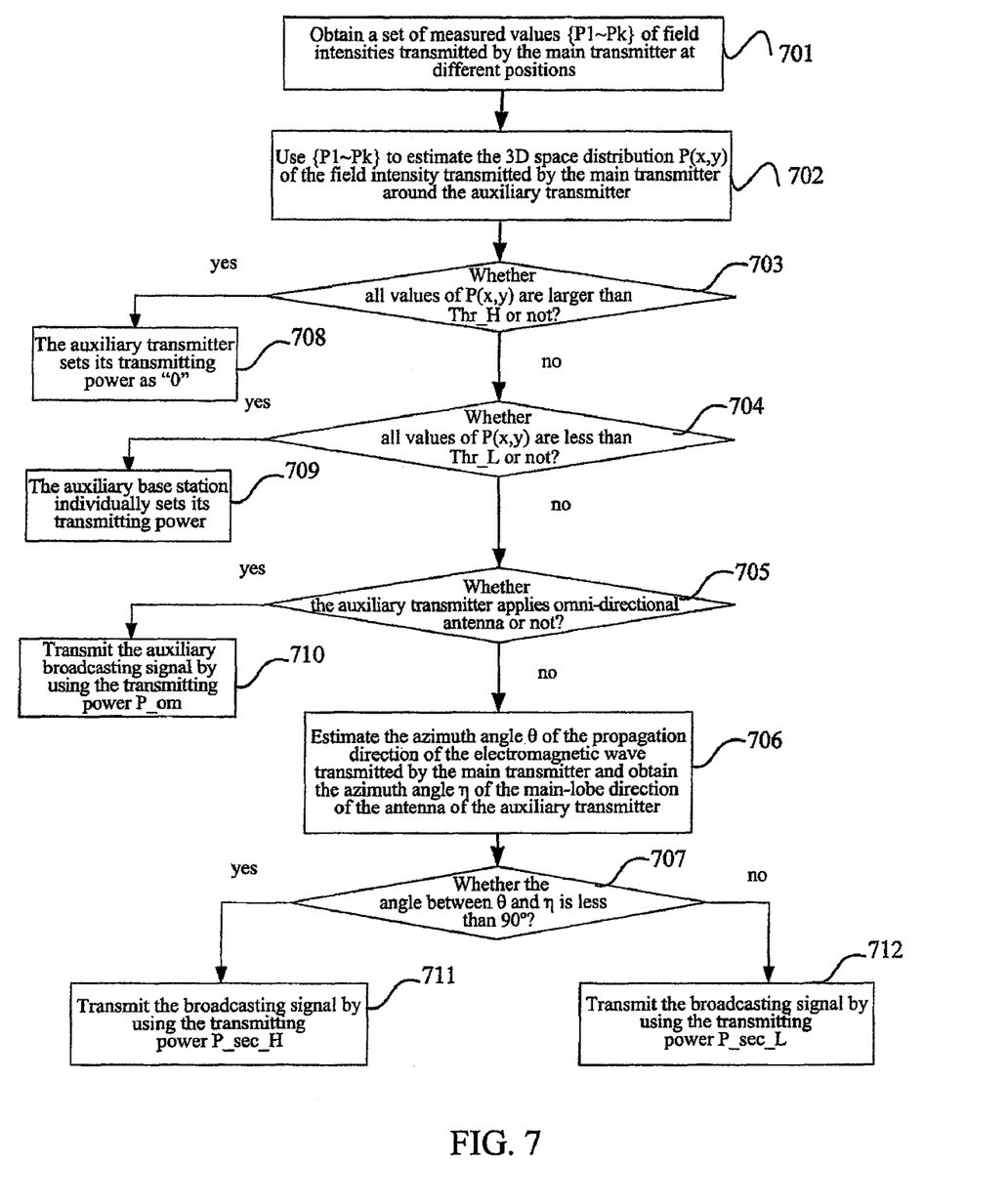
FIG. 7 is a method for determining the power of the inter-layer cooperative transmission with the same frequency in accordance with the present invention.

Therefore, the present invention offers a method for determining radiant power of an electromagnetic wave in the auxiliary layer 202, to determine the power relationship between the main transmitters and the auxiliary transmitters, which includes the following steps as shown in FIG. 7:

701: obtaining a set of measured values {P1~Pk} of field intensity excited by the main transmitters at different positions, including the measured value at the present transmitter and the measured value at the adjacent transmitters;

702: using {P1~Pk} to estimate the 3D space distribution P(x,y) of the field intensity excited by the main transmitter around the present auxiliary transmitter, where P(x,y) is an estimated value of the intensity of the electromagnetic field around the auxiliary transmitter through mathematical treatment, such as interpolation and median filter, of a set of measured values {P1~Pk} of the field intensity excited by the main transmitter at different positions;

703: determining if all values of P(x,y) are larger than Thr_H or not, wherein Thr_H is a predetermined value of the field intensity of the electromagnetic wave excited by the main transmitter; when the practically measured field intensity of the electromagnetic wave excited by the main transmitter is larger than Thr_H in the area covered by the auxiliary transmitter, it indicates that the signal is strong enough and it is unnecessary to obtain extra SFN gain through auxiliary transmission of auxiliary transmitters, and then proceeding to step 708; when the maximum value of P(x,y) is less than Thr_H in the area covered by the auxiliary transmitters, proceeding to step 704;

704: determining if all values of P(x,y) are less than Thr_L or not, wherein Thr_L is a predetermined value of the intensity of the electromagnetic wave field excited by the main transmitters; if the practically measured intensity of the electromagnetic wave field excited by the main transmitters is less than Thr_L in the area covered by the auxiliary transmitters, it indicates that the intensity of signal is lower than the intensity needed for receiving it normally, and the SFN gain required for normal receiving can not be obtained when the auxiliary transmitter transmits a signal whose intensity is comparative with the intensity of the electromagnetic wave field excited by the main transmitter in the area covered by the auxiliary transmitter, and then proceeding to step 709; if P(x,y) is larger than Thr_L, it indicates that the field intensity excited by the main transmitter adjacent to the auxiliary transmitter is in a normal range, and remarkable diversity gain can be obtained through the transmission of the auxiliary transmitter, and then proceeding to step 705;

705: determining whether the auxiliary transmitters apply omni-directional antenna or not, and if yes, proceeding to step 710, otherwise, proceeding to step 706; and 706: estimating the azimuth angle θ of the propagation direction of the electromagnetic wave transmitted by the main transmitter and obtaining the azimuth angle η of main lobe direction of the antenna of the auxiliary transmitter, then proceeding to step 707;

wherein, a specific method for estimating the azimuth angle θ of the propagation direction of the electromagnetic wave transmitted by the main transmitter is: calculating the azimuth angle θ according to the geographical coordinate of the main transmitter and the geographical coordinate of the auxiliary transmitter, the azimuth angle of the connection line from the geographical coordinate point of the main transmitter to the geographical coordinate point of the auxiliary transmitter is precisely the azimuth angle θ of the propagation direction of the electromagnetic wave excited by the main transmitter.

Another specific method for estimating the azimuth angle θ of the propagation direction of the electromagnetic wave transmitted by the main transmitter is: connecting the maximal value point and the minimal value point of P(x,y), and the azimuth angle of this connection line is estimated as the azimuth angle θ of the propagation direction of the electromagnetic wave excited by the main transmitter.

This method for determining radiant power of an electromagnetic wave in the auxiliary layer 202 further may include the steps of:

707: determining if the angle between θ and η is less than 90° or not, and if yes, then proceeding to step 711, otherwise, proceeding to step 712;

708: the auxiliary transmitter setting its transmitting power as "0", namely, the auxiliary transmitter does not perform transmission;

709: the auxiliary base station setting the transmitting power independently to meet the requirement of power for transmission;

710: applying transmitting power P_om to transmit an auxiliary broadcasting signal, wherein P_om is the value of the transmitting power required by the transmission of the omni-directional antenna;

711: applying transmit power P_sec_H to transmit a broadcasting signal, wherein P_sec_H is the transmitting power required by the auxiliary transmitter when the angle between θ and η is less than 90°, at this moment, the propagation direction of the electromagnetic wave transmitted by the auxiliary transmitter is roughly the same as the propagation direction of the electromagnetic wave transmitted by the main transmitter, and the P_sec_H selected by the auxiliary transmitter should ensure in theory that the intensity of the electromagnetic wave transmitted in the sector it covers is higher than the intensity of the electromagnetic wave of the main transmitter in most areas; and 712: applying transmit power P_sec_L to transmit a broadcasting signal, wherein P_sec_L is the transmitting power required by the auxiliary transmitter when the angle between θ and η is larger than 90°, at this moment, the propagation direction of the electromagnetic wave transmitted by the auxiliary transmitter is roughly opposite to the propagation direction of the electromagnetic wave transmitted by the main transmitter, and the P_sec_L selected by the auxiliary transmitter should ensure in theory that the intensity of the electromagnetic wave transmitted in the sector it covers is lower than the intensity of the electromagnetic wave of the main transmitter in most areas.

In the following, the specific applications of the system of the present invention will be described in combination with embodiments.

Embodiment 1: one embodiment of the double layer cooperative transmission structure with the same frequency, which is for illustrating the cooperative transmission between DVB_T and DVB_H.

The main transmitters in the main transmission layer 201 transmit DVB-T and DVB-H signals, and so do the auxiliary transmitters in the auxiliary transmission layer 202. The auxiliary transmitters in the auxiliary transmission layer 202 cooperatively transmit the DVB-T and DVB-H signals in the main transmission layer at the same frequency. The specific method is that: sending the DVB-T and DVB-H broadcasting code stream, which is also sent to the main transmitters (such as 201*a*, 201*b*), to the auxiliary transmitters in the auxiliary transmission layer 202, the auxiliary transmitters synchronically sending the DVB-T and DVB-H signals according to the arrival time, field intensity and information bit of the DVB-T and DVB-H electromagnetic waves transmitted by the main transmitters at the position where they are located. The auxiliary transmitters transmit the DVB-T and DVB-H signals through the same radio frequency channel and antenna feeder.

Embodiment 2: another embodiment of the double-layer cooperative transmission structure with the same frequency, which is for illustrating how the GSM system and DBV-T/H cooperatively realize terrestrial digital broadcasting.

FIG. 2 shows a system realizing terrestrial broadcasting through the cooperation between GSM and DVB-T/H, which includes: a main transmission layer 201 comprised of several DVB-T/H transmitters, an auxiliary transmission layer 202 comprised of the GSM base station with a digital broadcasting transmitter, wherein the broadcasting code stream used by DVB-T/H is distributed to the broadcasting transmitter through BACKHALL 203 of the GSM system.

According to the synchronization method and the method for determining power of the present invention, the GSM base station having digital broadcasting transmitters and the main transmission layer 201 comprised of the electromagnetic wave excited by DVB-T/H transmitters constitute the double layer cooperative transmission structure with the same frequency, through which the SFN gain is obtained to improve the indoor coverage performance of the DVB-T/H transmitter and support for a high-speed mobile receiver.

Although this embodiment takes the system with DVB-T/H standard for example, it is also adaptive to other terrestrial video broadcasting systems with OFDM modulation, such as ISDB and DMB, to develop into the terrestrial video broadcasting system based on cooperation. This method of this embodiment is also adaptive to the terrestrial digital audio broadcasting DAB.

Embodiment 3: another embodiment of the double layer cooperative transmission structure with same frequency, which is for illustrating how the CATV network and the DBV-T/H cooperate to realize terrestrial digital broadcasting.

FIG. 2 shows a system realizing terrestrial broadcasting through the cooperation of CATV network and DVB-T/H, which includes: a main transmission layer 201 comprised of several DVB-T/H transmitters, an auxiliary transmission layer 202 comprised of digital broadcasting transmitters connected to the CATV network, wherein the transmitter in the auxiliary transmission layer 202 depends on the CATV network; the transmitter in the auxiliary transmission layer 202 can only cooperate with the terrestrial broadcasting transmitters (DVB-T and/or TDV-H) to transmit the code stream, or it can also transmit its own service code stream besides cooperating with the terrestrial broadcasting transmitters (DVB-T and/or TDV-H) to transmit the code stream.

The broadcasting code stream sent to the DVB-T/H transmitter is distributed to the transmitters in the auxiliary transmission layer 202 which depends on CATV network through the CATV network 203. According to the synchronization method and the method for determining power of the present invention, the transmitters in the auxiliary transmission layer 202 which depends on the CATV network and the DVB-T/H transmitters in the main transmission layer 201 constitute a double layer cooperative transmission structure with the same frequency, through which SFN gain can be obtained to improve the indoor coverage performance of DVB-T/H transmitters and support for the high-speed mobile receivers.

Although this embodiment takes the system applying DVB-T/H standard for example, it is also adaptive to the cooperative transmission between other terrestrial video broadcasting systems applying OFDM modulation and the CATV network, such as the cooperative transmission between the terrestrial video broadcasting system ISDB, DMB (as well as its alternative standard in supporting mobile receiving) and the CATV network. The method of this embodiment is also adaptive to terrestrial digital audio broadcasting DAB.

Embodiment 4: an embodiment of the dual interlayer cooperative transmission structure, which is for illustrating how the WIMAX system and DBV-T/H cooperate to realize the terrestrial digital broadcasting.

FIG. 3 shows a system realizing terrestrial broadcasting through cooperation between WIMAX and DVB-T/H, which includes: an upper layer 201 of the dual interlayer cooperative structure, comprised of several DVB-T/H transmitters; an auxiliary transmission layer 202 in the middle layer 301 of the dual interlayer cooperative structure, comprised of several DVB-T/H transmitters, wherein the transmitters in the auxiliary transmission layer 202 transmit electromagnetic wave 202a, 202b, . . . , 202n; wherein the main transmission layer 201' in the middle layer 301 of the dual interlayer cooperative structure is comprised of several transmitters, generally, the coverage range of the transmitters in the main transmission layer 201' is comparative to that of 202a, 202b, . . . , 202n, while their working frequency is the same as that of the electromagnetic wave of the bottom layer 202' (including 202'a, 202'b, . . . , 202'n), whose coverage range includes 201'a, 201'b, . . . , 201'n.

202'a, 202'b, . . . , 202'n are several WIMAX base stations with broadcasting transmitters, while 201'a, 201'b, . . . , 201'n are several coverage ranges larger than that of the WIMAX base station; each of 201'a~n covers several WIMAX base stations with a broadcasting transmitter; 201'a, 201'b, . . . , 201'n and the broadcasting transmitters of the WIMAX work at the same frequency.

202a, 202b, . . . , 202n and 201'a, 201'b, . . . , 201'n are transmitted by the same transmitter. The transmitters in the middle layers are like a "double-sided tape", combining the DVB-T/H at the upper layer and the WIMAX at the bottom layer together, thereby realizing organic cooperation of broadcasting and wireless IP access systems on air interface.

This embodiment takes the system applying DVB-T/H standard for example. Similarly, a digital broadcasting transmission system with the cooperation of satellite and WIAMX can be constructed only by combining the terrestrial feeding system 203 with the distribution uplink of the satellite and replacing 201a, 201b with satellite digital broadcasting transmitters, which can greatly improve the indoor coverage and spectrum efficiency of the satellite broadcasting system. And the saved spectrum can also be used in WIAMX system.

To sum up, the cooperative transmission system of the present invention and the method thereof have the following effects:

1. greatly improving the spectrum efficiency of the broadcasting channel;
2. greatly improving the coverage, especially the indoor coverage of the broadcasting signal;
3. greatly improving the effect of mobile receiving of the broadcasting signal;
4. the non space-time coding diversity mode is totally compatible with the existing broadcasting system based on OFDM; and
5. offering a flexible way for spectrum management and spectrum usage, for example, the digital broadcasting network and the mobile communication network can share the spectrum in a mutually beneficial and win-win situation.

INDUSTRIAL APPLICABILITY

The present invention provides a cooperative transmission system for a digital broadcasting single frequency network and a method thereof, which make up the weakness of the existing single frequency network and greatly improve the spectrum efficiency of broadcasting channel, the coverage of a broadcasting signal (especially the indoor coverage) and the effect of mobile receiving of a broadcasting signal, and the non space-time encoding diversity mode in the present invention can be entirely compatible with the existing broadcasting system based on OFDM; Meanwhile, the present invention offers a flexible way for spectrum management and spectrum usage, for example, the digital broadcasting network and the mobile communication network can share the spectrum in mutual benefit and in a win-win situation.

What we claim is:

1. A cooperative transmission system applied in a digital broadcasting single frequency network, comprising:
   a first double-layer cooperative transmission structure with same frequency, and a second double-layer cooperative transmission structure with same frequency, which are vertically aggregated together;
   wherein each of the double-layer cooperative transmission structures with the same frequency comprises:
   a main transmission layer, comprising several main transmitters having the same transmitting frequency; an auxiliary transmission layer, comprising several auxiliary transmitters having the same transmitting frequency; wherein, in each of the double-layer cooperative transmission structures with the same frequency, a coverage range of electromagnetic wave transmitted by the main transmitters is larger than the coverage range of electromagnetic wave transmitted by the auxiliary transmitters; and there is an electromagnetic wave transmitted by at least one of the auxiliary transmitters in the coverage range of the electromagnetic wave transmitted by one main transmitter; the electromagnetic wave transmitted by the main transmitters and the electromagnetic wave transmitted by the auxiliary transmitters have the same frequency, carry the same information symbols and meet a synchronization relationship required for avoiding inter-symbol interference;
   the electromagnetic wave transmitted by the main transmitters in the first double-layer cooperative transmission structure with the same frequency and the electromagnetic wave transmitted by the main transmitters in the second double-layer cooperative transmission structure with the same frequency have different frequencies.

2. The system of claim 1, wherein a stream distribution network used by the auxiliary transmitters is a combination of the following one or more networks: a radio access network of cellular mobile communication, a CATV hybrid fiber and cable network, a passive optical network, an active optical network, a power-line communication network, and a wireless network.

3. The system of claim 1, wherein the transmitters in the auxiliary transmission layer in the first double-layer cooperative transmission structure with the same frequency use a CATV network as their stream distribution network.

4. The system of claim 3, wherein the electromagnetic waves transmitted by the main transmitters and the auxiliary transmitters in the first double-layer cooperative transmission structure with the same frequency include a combination of the following one or more signals: a DVB-T signal, a DVB-H signal, or a DVB-S signal.

5. The system of claim 1, wherein the transmitters in the auxiliary transmission layer in the first double-layer cooperative transmission structure with the same frequency cooperatively transmit code stream sent by territorial broadcasting transmitters, or also transmit their own service code stream besides cooperatively transmitting the code stream sent by the territorial broadcasting transmitters.

6. The system of claim 1, wherein when the second double-layer cooperative transmission structure with the same frequency is aggregated vertically with the first double-layer cooperative transmission structure with same frequency, they construct a dual interlayer cooperative transmission structure, wherein, the main transmission layer of the first double-layer cooperative transmission structure with the same frequency is an upper layer, while the auxiliary transmission layer of the second double-layer cooperative transmission structure with the same frequency is a bottom layer, and the auxiliary transmission layer of the first double-layer cooperative transmission structure with the same frequency and the main transmission layer of the second double-layer cooperative transmission structure with the same frequency jointly construct a middle layer.

7. The system of claim 1, wherein the main transmission layer in the first double-layer cooperative transmission structure with the same frequency and the auxiliary transmission layer in the first double-layer cooperative transmission structure with the same frequency perform joint space-time coding together.

8. The system of claim 1, wherein the electromagnetic waves transmitted by the main transmission layer in the first double-layer cooperative transmission structure with the same frequency, the auxiliary transmission layer in the first double-layer cooperative transmission structure with the same frequency and the auxiliary transmission layer in the second double-layer cooperative transmission structure with the same frequency perform joint space-time coding together.

9. The system of claim 1, wherein the electromagnetic waves transmitted by the main transmitters and by the auxiliary transmitters in the same double-layer cooperative transmission structure with the same frequency further meet a power relationship required for single frequency network gain.

10. The system of claim 9, wherein the power relationship between the main transmitters and the auxiliary transmitters required for meeting the single frequency network gain is:
  in an area covered by an auxiliary base station, the intensities of the electromagnetic waves transmitted by the main transmitters and by the auxiliary transmitters are comparative, and a difference of the intensities is within the range of a predetermined threshold;
  in an area where the intensity of the signal transmitted by the main transmitters is higher than a predetermined maximal threshold, the auxiliary transmitters will not transmit signal; and
  when the intensity of the signal transmitted by the main transmitters is lower than a predetermined minimal threshold, the auxiliary transmitters will independently decide the intensity of transmitting signal.

11. The system of claim 1, wherein the electromagnetic waves transmitted by the main transmitters and the auxiliary transmitters in the same double-layer cooperative transmission structure with the same frequency are encoded to be orthogonal frequency diversity multiplexing signals or spread spectrum signals.

12. The system of claim 1, wherein the electromagnetic waves transmitted by the main transmitters and the auxiliary transmitters in the same double-layer cooperative transmission structure with the same frequency perform joint space-time coding.

13. The system of claim 1, wherein the main transmitters and the auxiliary transmitters in the same double-layer cooperative transmission structure with the same frequency transmit the electromagnetic waves by the same transmission mode, including continuous transmission or intermittent, periodic transmission by way of time slot.

14. A synchronization method for a cooperative transmission system applied in a digital broadcasting single frequency network, wherein the cooperative transmission system includes: a first double-layer cooperative transmission structure with same frequency, and a second double-layer cooperative transmission structure with same frequency, which are vertically aggregated together, wherein each of the double-layer cooperative transmission structures with the same frequency comprises: (a) a main transmission layer, comprising several main transmitters having the same transmitting frequency; (b) an auxiliary transmission layer, comprising several auxiliary transmitters having the same transmitting frequency; wherein, in each of the double-layer cooperative transmission structures with the same frequency, a coverage range of electromagnetic wave transmitted by the main transmitters is larger than the coverage range of electromagnetic wave transmitted by the auxiliary transmitters; and there is an electromagnetic wave transmitted by at least one of the auxiliary transmitters in the coverage range of the electromagnetic wave transmitted by one main transmitter; the electromagnetic wave transmitted by the main transmitters and the electromagnetic wave transmitted by the auxiliary transmitters have the same frequency, carry the same information symbols and meet a synchronization relationship required for avoiding inter-symbol interference; and wherein the electromagnetic wave transmitted by the main transmitters in the first double-layer cooperative transmission structure with the same frequency and the electromagnetic wave transmitted by the main transmitters in the second double-layer cooperative transmission structure with the same frequency have different frequencies, and wherein the synchronization method is for achieving the synchronization relationship between the main transmitters and the auxiliary transmitters in the double-layer cooperative transmission structure with the same frequency, the synchronization method comprising the steps of:
  (1) the auxiliary transmitter obtaining a protection interval $\Delta$ used by the main transmission layer, a transmitting time $t_R$ of the electromagnetic wave corresponding to the coverage radius of the auxiliary transmitter, and determining an error $\epsilon$ of a transmission time point of the auxiliary transmitter;
  (2) comparing the protection interval $\Delta$ with the transmission time $t_R$, and if $\Delta \gg t_R$, then proceeding to step (6), otherwise, proceeding to step (3);
  (3) determining whether the auxiliary transmitter applies omni-directional antenna or not, and if no, then proceeding to step (4), if yes, proceeding to step (5);
  (4) obtaining azimuth angle $\theta$ of a propagation direction of the electromagnetic wave transmitted by the main transmitter and azimuth angle $\eta$ of a main-lobe direction of the antenna of the auxiliary transmitter, if the angle between θ and η is larger than 90°, then proceeding to step (5), otherwise, proceeding to step (6);

(5) obtaining an arrival time $t_0$ of a signal transmitted by the main transmitter which the auxiliary transmitter cooperates with in the main transmission layer, calculating a time advance β of the transmission time of the auxiliary transmitter based on $t_0$, determining that the auxiliary transmitter synchronically transmits a signal with its cooperative main transmitter at the time point $t_0$-β and within an error range ±ϵ; and (6) obtaining the arrival time $t_0$ of the signal transmitted by the main transmitter which the auxiliary transmitter cooperates with in the main transmission layer, and determining that the auxiliary transmitter synchronically transmits a signal with its cooperative main transmitter at the time point $t_0$ and within an error range ±ϵ.

15. A method for determining power for a cooperative transmission system applied in a digital broadcasting single frequency network, wherein the cooperative transmission system includes: a first double-layer cooperative transmission structure with same frequency, and a second double-layer cooperative transmission structure with same frequency, which are vertically aggregated together, wherein each of the double-layer cooperative transmission structures with the same frequency comprises: (a) a main transmission layer, comprising several main transmitters having the same transmitting frequency; (b) an auxiliary transmission layer, comprising several auxiliary transmitters having the same transmitting frequency; wherein, in each of the double-layer cooperative transmission structures with the same frequency, a coverage range of electromagnetic wave transmitted by the main transmitters is larger than the coverage range of electromagnetic wave transmitted by the auxiliary transmitters; and there is an electromagnetic wave transmitted by at least one of the auxiliary transmitters in the coverage range of the electromagnetic wave transmitted by one main transmitter; the electromagnetic wave transmitted by the main transmitters and the electromagnetic wave transmitted by the auxiliary transmitters have the same frequency, carry the same information symbols and meet a synchronization relationship required for avoiding inter-symbol interference; and wherein the electromagnetic wave transmitted by the main transmitters in the first double-layer cooperative transmission structure with the same frequency and the electromagnetic wave transmitted by the main transmitters in the second double-layer cooperative transmission structure with the same frequency have different frequencies, and wherein the method for determining the power determines a power relationship between the main transmitters and the auxiliary transmitters in the double-layer cooperative transmission structure with the same frequency, the method for determining the power comprising the steps of:

(A) the auxiliary transmitter obtaining a set of measured values {P1~Pk} of field intensities transmitted by its cooperative main transmitters at different locations, and calculating an estimated value P(x,y) of a distribution of a field intensity transmitted by the main transmitters adjacent to the auxiliary transmitter;

(B) determining if all values of P(x,y) are larger than a predetermined high power threshold Thr_H or not, if yes, directly determine that a transmit power of the auxiliary transmitter is 0, otherwise, proceeding to (C);

(C) determining if all values of P(x,y) are less than a predetermined low power threshold Thr_L or not, if yes, the auxiliary transmitter independently determining its own transmitting power, otherwise, proceeding to (D);

(D) determining if the auxiliary transmitter applies omni-directional antenna or not, if yes, using a transmitting power P_om required by the transmission of omni-directional antenna as the transmitting power, otherwise, proceeding to step (E);

(E) obtaining the azimuth angle θ of the propagation direction of the electromagnetic wave transmitted by the main transmitter and the azimuth angle η of a main-lobe direction of an antenna of the auxiliary transmitter, if the angle between θ and η is less than 90°, proceeding to step (F), otherwise, proceeding to step (G);

(F) determining that in most areas of the sector covered by the auxiliary transmitter, a power value P_sec_H with which the intensity of the electromagnetic wave transmitted is higher than the intensity of the electromagnetic wave of the main transmitter is used as the transmitting power; and (G) determining that in most areas of the sector covered by the auxiliary transmitter, the power value P_sec_L with which the intensity of the electromagnetic wave transmitted is lower than the intensity of the electromagnetic wave of the main transmitter is used as the transmitting power.

\* \* \* \* \*